United States Patent [19]

Hofbauer et al.

[11] Patent Number: 4,508,073
[45] Date of Patent: Apr. 2, 1985

[54] COMBUSTION SPACE OF A PISTON DRIVEN INTERNAL COMBUSTION ENGINE

[75] Inventors: August Hofbauer, Pforzheim; Michael Beer, Leonberg, both of Fed. Rep. of Germany

[73] Assignee: Dr. Ing. h.c.F. Porsche A.G., Fed. Rep. of Germany

[21] Appl. No.: 509,820

[22] Filed: Jun. 30, 1983

[30] Foreign Application Priority Data

Jun. 30, 1982 [DE] Fed. Rep. of Germany ....... 3224337

[51] Int. Cl.³ .............................................. F02F 3/24
[52] U.S. Cl. .................................... 123/307; 123/309; 123/310; 123/430; 123/661
[58] Field of Search ............... 123/661, 657, 671, 310, 123/306, 307, 309, 430

[56] References Cited

U.S. PATENT DOCUMENTS

| | | | |
|---|---|---|---|
| 3,418,981 | 12/1968 | Von Seggern et al. | 123/430 |
| 4,144,860 | 3/1979 | Muranaka et al. | 123/310 |
| 4,162,661 | 7/1979 | Nakanishi et al. | 123/661 |
| 4,166,436 | 9/1979 | Yamakawa | 123/307 |
| 4,296,720 | 10/1981 | Nakanishi et al. | 123/661 |
| 4,324,214 | 4/1982 | Garcea | 123/661 |
| 4,421,081 | 12/1983 | Nakamura et al. | 123/661 |

FOREIGN PATENT DOCUMENTS

| | | | |
|---|---|---|---|
| 802762 | 9/1936 | France | 123/307 |
| 1217755 | 12/1970 | United Kingdom | 123/661 |
| 1242594 | 8/1971 | United Kingdom | 123/310 |

*Primary Examiner*—Craig R. Feinberg
*Attorney, Agent, or Firm*—Craig and Burns

[57] ABSTRACT

A reciprocating lens-like combustion space is formed in a piston internal combustion engine which is located with approximately one-half in a recess of the piston top and with approximately the other half in the cylinder head. By the dimensioning of the combustion space and the coordination thereof to the inlet and exhaust valve, a vortex flow is produced with a ring-shaped mixing zone of high fuel concentration, in which the ignition electrodes of two spark plugs are arranged diametrally opposite one another.

13 Claims, 6 Drawing Figures

COMBUSTION SPACE OF A PISTON DRIVEN INTERNAL COMBUSTION ENGINE

The present invention relates to the combustion space of a reciprocating piston internal combustion engine, which is disposed in part within the piston and in part in the cylinder head and which includes an inlet valve, an exhaust valve and an ignition device for the fuel-air mixture.

The design and construction of such combustion spaces has been the subject of numerous efforts since the beginnings of engine design. In more recent times these development intentions gain in further significance by the requirements for the smallest possible exhaust gas emission and lowest possible fuel consumption, which can both be fulfilled only by a meaningful design and configuration of the combustion spaces.

Starting from this general postulation of the problem, the aim of the present invention resides in providing a combustion space which can be realized with simple means from a manufacturing point of view and assures a high combustion efficiency over the entire rotational speed range.

The underlying problems are solved according to the present invention by the formation of a vortex flow, closed in itself, from an outer potential flow and an inner rotary flow concentric thereto in the combustion space by the appropriate dimensioning and coordination of the inlet valve and exhaust valve disposed at an acute angle to the piston axis, and by the ignition device being arranged in the annularly shaped mixing zone of high fuel concentration between the rotary flow and the potential flow. During the compression of the sucked-in fuel-air mixture, a vortex or whirl is produced in the thus-constructed axially symmetrical combustion space, which when approaching the upper dead-center position assumes the flow shape of an endless potential-rotary vortex flow, as is explained in detail in the publication, "Staub"0 ["Dust"], Volume 23, No. 11, November, 1963, pages 491 to 501. This vortex consists of an outer, spirally extending potential flow which passes over at the bottom of the piston recess into an inner, also spiral rotary flow concentric thereto and proceeding in the opposite direction, which after passing through the combustion space again combines with the outer potential flow at the upper part of the cylinder head. It is at this place that a vortex source is formed with a vortex sink being produced at the bottom of the piston recess or trough. Centrifugal forces act on the mixture which stem from the rotary flow, and friction forces, resectively, drag forces caused by the vortex source act on the mixture, which are both directed radially outwardly. In the outer potential flow, the radially inwardly directed drag forces predominate by reason of the sink flow. Altogether, a resulting force effect is produced therefore from the center toward the outside, as well as from the outer vortex edge in the direction toward the inside toward a center annularly shaped mixing zone located between rotary flow and potential flow, into which are driven primarily the particles rich in mass, i.e., the fuel particles. The ignition device is arranged in this mixing zone. A stratification charge effect results therefrom, which is achieved without additional structural parts, solely by the construction of the combustion space in accordance with the present invention. The axially symmetrical construction of the combustion space in accordance with the present invention facilitates its manufacture and dimensioning. Its dimensions can be maintained more accurately than if unilateral raised portions and profiles were necessary.

In a preferred embodiment of the present invention, the ignition device includes two spark plugs arranged in the mixing zone, which has a noticeably higher fuel concentration than the remaining combustion space. After the ignition of the rich mixture present thereat, the entire annularly shaped mixing zone ignites very rapidly. From there, the flame front expands radially outwardly and inwardly and seizes the entire combustion space disposed axially symmetrically to the mixing zone.

As shown in theory, the middle diameter of the mixing zone is dependent on the angular velocity of the vortex, which in turn is a function of the piston velocity, respectively, of the engine rotational speed. In order to take into consideration this fact, according to a further feature of the present invention, the two spark plugs are so arranged that their ignition electrodes have a different radial distance to the center axis of the piston, respectively, of the mixing zone. At a middle piston velocity, the one spark plug is seated at the outer radius of the mixing zone while the other is seated at the inner radius thereof. If the middle diameter of the mixing zone increases with decreasing engine rotational speed, the one spark plug is then the mixing zone whereas if the diameter of the mixing zone is reduced, the other spark plug is then in the mixing zone. Thus, the advantages of the stratification charge remain preserved over the entire rotational speed range. If two spark plugs are necessary anyhow for safety reasons as is the case, for example, in aircraft engines, then this advantage is attained without additional constructive expenditures. The installation of two spark plugs additionally offers the advantage that during the ignition thereof, the flame paths to the squeeze areas coordinated thereto are equally long, as a result of which a uniform flame expansion into the entire combustion space is attained.

During the expansion stroke of the piston, the endless vortex collapses; however, both in the upper area of the cylinder head and also in the piston trough residual vortices remain preserved, by which the new in-flowing mixture newly flowing into the combustion space is seized. During the compression stroke, these residual vortices again combine into the endless rotary flow as described above.

These and other objects, features and advantages of the present invention will become more apparent from the following description when taken in connection with the accompanying drawing which shows, for purposes of illustration only, one embodiment in accordance with the present invention, and wherein.

Figure 1:
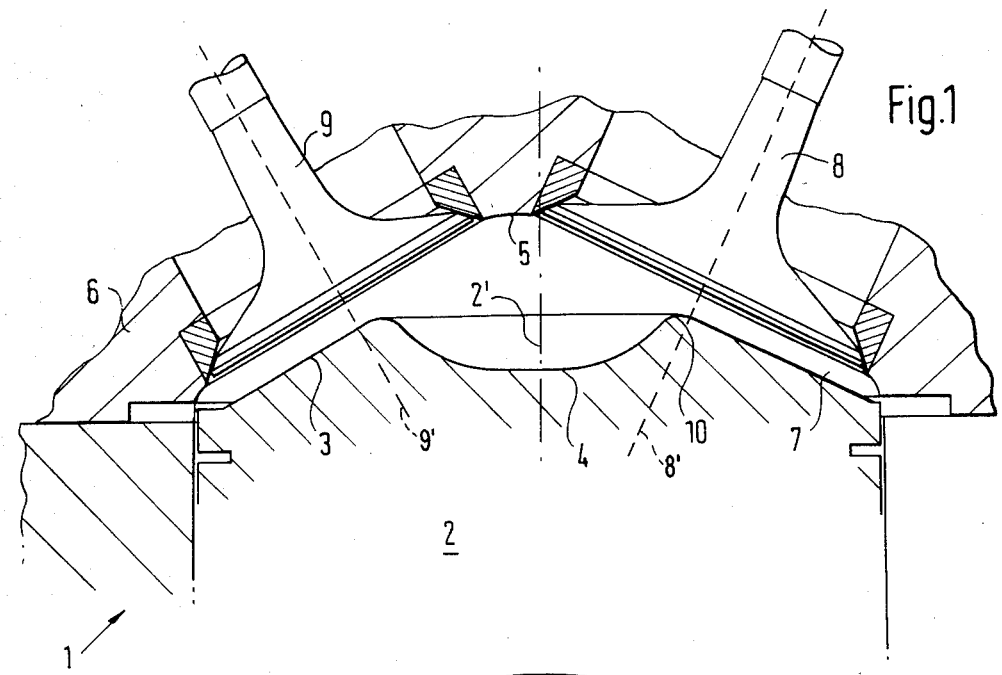
FIG. 1 is a partial cross-sectional view through the combustion space of an internal combustion engine in accordance with the present invention.
Figure 2:
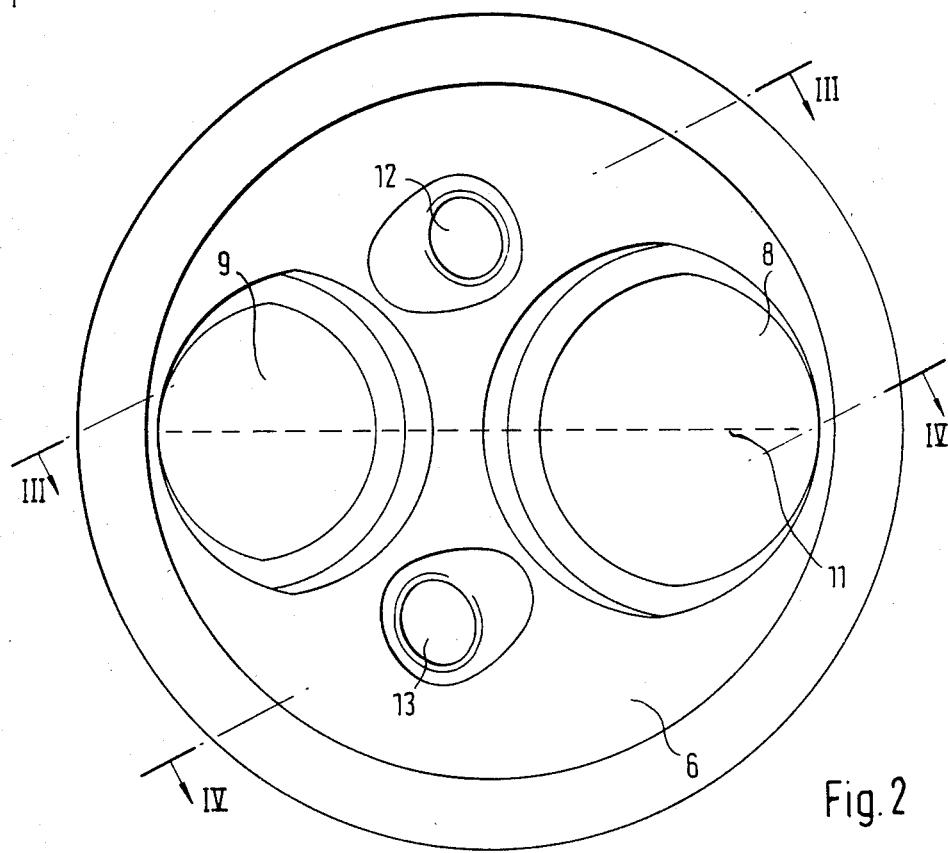
FIG. 2 is a plan view on the base surface of the cylinder head according to FIG. 1.
Figure 3:
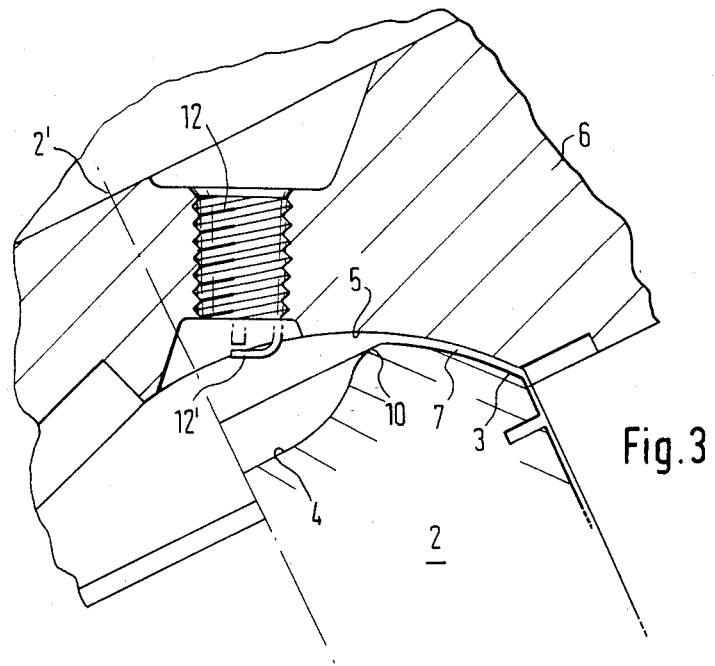
FIG. 3 is a cross-sectional view, taken along line III—III of FIG. 2.
Figure 4:
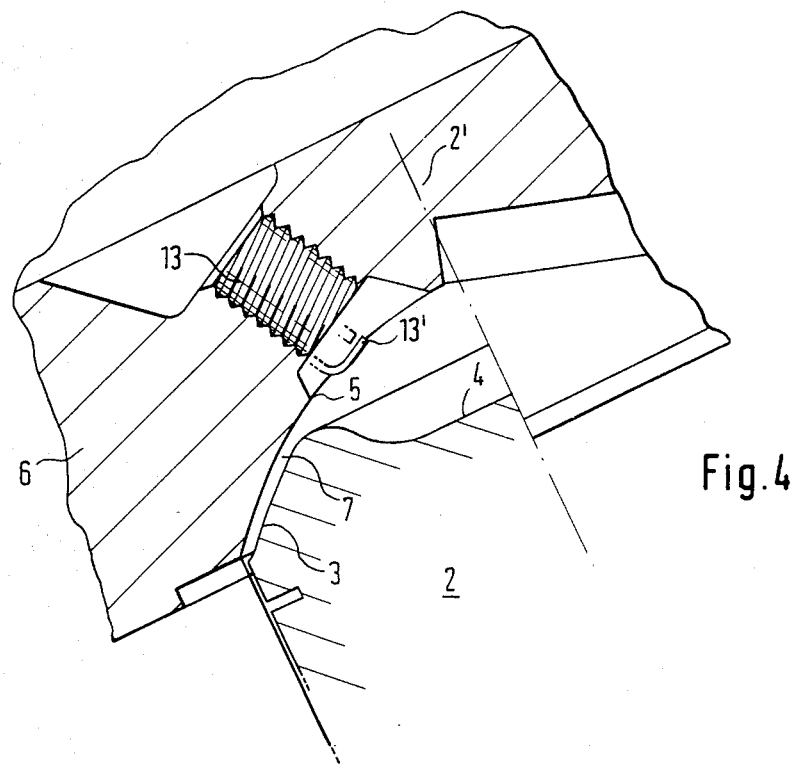
FIG. 4 is a cross-sectional view taken along line IV—IV of FIG. 2.

Referring now to the drawing wherein like reference numerals are used throughout the various views to designate like parts, a piston 2 with a generally spherical end face 3 is longitudinally guided in the cylinder block generally designated by reference numeral 1 of a reciprocating piston internal combustion engine. A trough or recess 4 is machined centrally into the piston top which together with the inner wall 5 of the cylinder head 6 which is itself curved upwardly and is generally spherically shaped above the spherical end face 3, forms a lens-shaped combustion space that lies with one-half in the piston and with the other half in the cylinder head. Circumferential squeeze areas 7 adjoin the combustion space on the outside thereof, which are constructed symmetrically to the piston axis 2'. In the cross sections according to FIGS. 3 and 4 corresponding to the lines III—III, respectively, IV—IV of FIG. 2, the squeeze area amounts to about 8% of the combustion space area. The inlet valve 8 is arranged at an angle of 25° to the piston axis 2' while the exhaust valve 29 is arranged at an angle of 30° to the piston axis 2'. The trough or recess 4 of the piston 2 transitions through an arcuately shaped area into the squeeze areas 7, whereby an arcuately shaped crown or cup 10 lies in the upper dead-center position of the piston on the axis 8' of the inlet valve 8.

Figure 5:
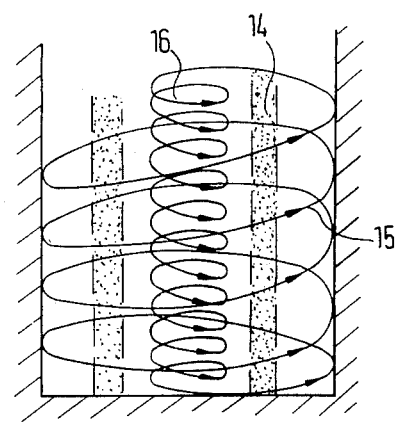
FIGS. 5 and 6 illustrate schematically a potential-rotary whirl flow in a cylindrical space.
Figure 6:
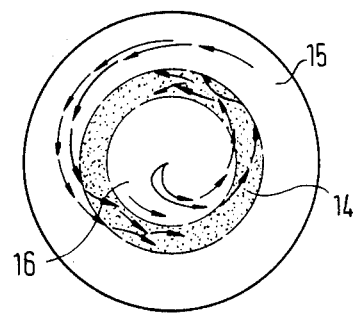

On both sides of and at right angles to the line 11 connecting the center axes 8' and 9' of the inlet and exhaust valves 8 and 9, spark plugs 12 and 13 are screwed into the cylinder head. Each spark plug forms an angle of about 28° to the piston axis 2'. Their ignition electrodes 12' and 13' project into the mixing zone 14 (FIGS. 5 and 6) of a vortex flow forming in the combustion space which includes a potential flow 15 and of a rotary flow 16 concentric thereto which rotates in the same direction of rotation but proceeds in the opposite direction, i.e., downwardly in FIG. 5 while the potential flow 15 proceeds upwardly. Such a rotary flow is illustrated in FIG. 5 relative to a cylindrical wall. If the wall, as in the instant case, is part of a lens-like combustion space, then the contour of the potential flow is deformed corresponding to the lens shape. The rotary flow remains essentially cylindrical. As shown in FIG. 6, the particles of the flow which are rich in mass, i.e., the fuel particles of a fuel-air mixture, migrate from the inside and from the outside toward the center annularly shaped mixing zone 14 which therefore has a considerably higher fuel concentration than the remaining combustion space. Since the ignition electrodes 12' and 13' are arranged in this rich mixing zone, and as discussed above are disposed so that one electrode is at the inside and one is at the outside of an average sized mixing zone, an ignition is also assured if the combustion engine is operated with a relatively lean mixture. The vortex flow rotating uniformly in the axially symmetrical combustion space allows the flame front, after the ignition, to progress uniformly and produces a more complete combustion than has been possible with the internal combustion engines customary heretofore. It follows from the above that when the middle diameter of the mixing zone increases with decreasing engine rotational speed, the mixing zone will have moved such that the spark plug disposed farther from the piston axis will be in the mixing zone and when the middle diameter decreases, the mixing zone will have moved such that the spark plug which is disposed closer to the piston axis will be in the mixing zone.

The ignition of the spark plugs may take place in any suitable, known manner. However, according to another feature of the present invention, the ignition electrodes 12' and 13' are so controlled by conventional means as to ignite sequentially one after the other with only a slight time delay therebetween.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A combustion space of a reciprocating piston internal combustion engine having piston means and cylinder head means for delimiting a combustion space, said combustion space being located in part within the piston means and in part within the cylinder head means, recess means centrally disposed in an end surface of said piston means and an upwardly arched wall in said cylinder head means together forming a substantially axially symmetrical combustion space, said upwardly arched wall including an inlet valve and an exhaust valve and means for causing ignition, said piston means with said recess means and said cylinder head means cooperating to form an endless vortex flow from an outer potential flow and an inner concentric rotary flow in the combustion space by dimensioning and coordination to the inlet valve and exhaust valve, the axes of the inlet valve and the exhaust valve each being disposed at an acute angle to the piston axis, the means for ignition including at least two spark plugs with ignition electrodes protruding into the combustion space, one of said at least two spark plugs being disposed on an opposite side of a plane passing through the axes of the intake and exhaust valves from another of said at least two spark plugs, and ignition electrodes of said opposed spark plugs being disposed at different distances from the piston axis such that when the middle diameter of a mixing zone of high fuel concentration formed between the rotary flow and the potential flow increases with decreasing engine rotational speed the mixing zone moves such that one of the opposed ignition electrodes is in the mixing zone and when the middle diameter of the mixing zone decreases, another of the opposed ignition electrodes is in the mixing zone.

2. A combustion space according to claim 1, wherein at a middle piston velocity one ignition electrode is arranged near an inner edge of the mixing zone and the other ignition electrode is near an outer edge of the mixing zone.

3. A combustion space of a reciprocating piston internal combustion engine having piston means and cylinder head means for delimiting a combustion space, said combustion space being located in part within the piston means and in part within the cylinder head means, recess means centrally disposed in an end surface of said piston means and an upwardly arched wall in said cylinder head means together forming a substantially axially symmetrical combustion space, said upwardly arched wall including an inlet valve and an exhaust valve and means for causing ignition, said piston means with said recess means and said cylinder head means cooperating to form an endless vortex flow from an outer potential flow and an inner concentric rotary flow in the combustion space by dimensioning and coordination to the inlet valve and exhaust valve, the axes of the inlet valve and the exhaust valve each being disposed at an acute angle to a piston axis, the means for ignition including at least two spark plugs with ignition electrodes protruding into the combustion space, one of said at least two spark plugs disposed on an opposite side of a plane passing through the axes of the intake and exhaust valves from another of said at least two spark plugs, said ignition electrodes being disposed at different distances from the piston axis such that at a middle piston velocity one of the ignition electrodes of one of the at least two spark plugs is arranged substantially at an inner edge of a mixing zone of high fuel concentration formed between the rotary flow and the potential flow and another ignition electrode of another of the at least two spark plugs is arranged substantially at an outer edge of the mixing zone.

4. A combustion space according to claim 3, wherein the ignition electrodes ignite sequentially with slight time delay.

5. A combustion space according to claim 3, wherein spherically shaped arcuate squeeze areas are disposed between the piston means and the cylinder head means, which are constructed substantially identical to one another and symmetrically to the piston axis.

6. A combustion space according to claim 5, wherein the recess means of the piston means passes over through an arc into the squeeze areas and extends radially so far that a crest of the arc is disposed approximately on an axis of the inlet valve in an upper dead center position of the piston means.

7. A combustion space according to claim 5, wherein the at least two spark plugs includes two spark plugs arranged approximately perpendicularly to a line connecting axes of the inlet valve and exhaust valve.

8. A combustion space according to claim 3, wherein the at least two spark plugs includes two spark plugs with ignition electrodes disposed diametrally opposite one another.

9. A combustion space according to claim 8, wherein the ignition electrodes ignite sequentially with slight time delay.

10. A combustion space according to claim 1, wherein the at least two spark plugs includes two spark plugs arranged approximately perpendicularly to a line connecting axes of the inlet valve and exhaust valve.

11. A combustion space according to claim 8, wherein the two spark plugs are arranged approximately perpendicularly to a line connecting axes of the inlet valve and exhaust valve.

12. A combustion space according to claim 11, wherein spherically shaped arcuate squeeze areas are disposed between the piston means and the cylinder head means, which are constructed substantially identical to one another and symmetrically to the piston axis.

13. A combustion space according to claim 12, wherein the recess means of the piston means passes over through an arc into the squeeze areas and extends radially so far that a crest of the arc is disposed approximately on an axis of the inlet valve in an upper dead center position of the piston means.

* * * * *